United States Patent [19]

Studhalter et al.

[11] 4,391,102

[45] Jul. 5, 1983

[54] FRESH WATER PRODUCTION FROM POWER PLANT WASTE HEAT

[75] Inventors: Walter R. Studhalter, Woodland Hills; William E. Amend, Rolling Hills Estates; Norman L. Helgeson, Pasadena, all of Calif.

[73] Assignee: Biphase Energy Systems, Santa Monica, Calif.

[21] Appl. No.: 291,339

[22] Filed: Aug. 10, 1981

[51] Int. Cl.[3] .......................... F01K 25/04; F03G 7/00

[52] U.S. Cl. ...................................... 60/649; 60/641.2

[58] Field of Search ............................ 415/80, 81, 82; 417/348; 60/649, 641.2

[56] References Cited

U.S. PATENT DOCUMENTS

| | | | |
|---|---|---|---|
| 2,933,287 | 4/1960 | Caddell | 415/81 |
| 4,027,483 | 6/1977 | Wahl | 415/80 |
| 4,298,311 | 11/1981 | Ritzi | 415/80 |

*Primary Examiner*—Allen M. Ostrager
*Attorney, Agent, or Firm*—William W. Haefliger

[57] ABSTRACT

Reaction turbine and pump apparatus includes:

(a) a first nozzle or nozzles to receive heated fluid for expansion therein to form a two-phase discharge of gas and liquid, (b) a separator rotor having an axis and a rotating surface located in the path of said discharge for supporting a layer of separated liquid on said surface, (c) the rotor having a reaction nozzle or nozzles to communicate with said layer to receive liquid therefrom for discharge in a direction or directions developing torque acting to rotate the rotor, (d) and a pump associated with and driven by the rotor, the pump including an annular rim surface to receive impingement of liquid to be pumped, the liquid collecting as a rotating ring on the rim surface.

In addition, the rim surface may be integral with the separator rotor; and the heated fluid may consist of a low vapor pressure fluid component which remains liquid and a high vapor pressure fluid component which at least partially vaporizes in the first nozzle or nozzles.

18 Claims, 9 Drawing Figures

FRESH WATER PRODUCTION FROM POWER PLANT WASTE HEAT

BACKGROUND OF THE INVENTION

This invention relates generally to a two phase nozzle, separator, turbine and pump used for efficient energy management of a reverse osmosis desalination system; more specifically it concerns desalination systems obtaining power from waste-heat sources, and conserving power by efficient recovery of reverse osmosis pressure energy.

There is a continuing need for energy conserving desalination systems. Attempts to achieve this objective have led to the use of reverse osmosis apparatus; however, costs for pumping energy have remained objectionably high.

SUMMARY OF THE INVENTION

It is a major object of the invention to achieve significant reduction in energy usage and decreased cost, in a desalination system (or liquid decontaminating system); further, another objective is to produce relatively large quantities of fresh water from available waste heat. As will be seen, these objectives may be realized through the employment of a two-phase turbine which is connected to drive a sea water or brine pump supplying a reverse osmosis plant, the turbine being supplied with a working fluid such as saturated water (or other liquid) heated by waste heat, as from a power plant. Fresh water can then be produced at a cost reduction of about 23% as compared with a conventional reverse osmosis plant. Additional energy savings and cost reduction are realized through efficient conservation of the pressure energy contained in reject brine from the reverse osmosis process.

Basically, the system comprises:

(a) apparatus including nozzle means and a pump, the pump having an inlet connected to a brine source and the pump having an outlet, (b) such apparatus including a separator wheel rotated in response to fluid jetting through the nozzle means and into driving relation with the wheel, pressure being imparted to the brine in response to wheel rotation, (c) and reverse osmosis apparatus connected to the pump outlet to receive pressurized brine therefrom, and to deliver fresh water extracted from the brine.

Further, and as will be seen in the system, waste heat is typically supplied to the fluid, which comprises working fluid; the nozzle means produces a liquid and vapor discharge, the liquid discharge acting to drive the wheel, and the vapor separating out of the fluid stream; and the apparatus includes a rotor driven by the energy of the liquid collecting on the wheel. In addition, the pump typically may include a rotating surface on which a rotating ring of brine (or liquid) collects, and a scoop or scoops with pressure diffusers to project into the liquid ring and remove liquid in pressurized state, as for supply to the reverse osmosis equipment.

The two-phase working fluid may typically produce steam when jetted through the nozzle means, the steam condensing to add to the fresh water supplied by the reverse osmosis equipment; and a steam condenser may pass cooling liquid such as brine for pre-heating thereof prior to waste heat transfer to the brine and heated brine supply to the nozzle means.

Typically and as will be seen, the apparatus comprises a reaction turbine, the rotor having a rotating annular surface located in the path of the discharge for supporting a centrifugally pressurized layer of separated liquid on the surface, the rotor having reaction nozzle means to communicate with the layer to receive pressurized liquid for discharge in a direction or directions developing torque acting to rotate the rotor. Accordingly, a very efficient drive for the pump is achieved, which results in an overall superior desalination system.

A further aspect of the invention includes the provision of a reaction turbine as referred to, coupled with a pump associated with and driven by the rotor, the pump including an annular rim surface to receive impingement of liquid to be pumped, the liquid collecting as a rotating ring; further, the rim surface may be integral with the turbine rotor, and the pump typically includes a scoop to remove the collected liquid, and a nozzle to jet fluid toward the rim surface.

A still further aspect of the invention includes the provision of efficient means of recovering the pressure energy of the reject brine from the reverse osmosis system. This pressurized reject brine typically constitutes 70% of the fluid entering the reverse osmosis system, the other 30% being the delivered fresh water. The pressure energy is recovered simply and efficiently by using this pressurized reject brine as the working fluid for the two-phase reaction turbine.

In contrast to reverse osmosis systems where the pressure energy may be recovered by a separate mechanical hydaulic turbine, if it is recovered at all, the two-phase turbine pressure recovery is accomplished at higher efficiency by integration with the two-phase turbine already operating on waste heat energy supply. Thus no separate mechanical elements are required for reject brine pressure recovery.

In contrast to turbines operating on gas or vapor, the mechanical construction of the two-phase turbine utilizes fewer close tolerances and fewer numbers of parts, and the gas or vapor extansion takes places in a stationary nozzle or nozzles. Further, and in contrast to conventional gas turbines, the expanding two-phase mixture in the nozzle is of low vapor quality; that is, the mass fraction of vapor to liquid is typcally 5 to 25%. A a result, the enthalpy change per unit mass of mixture across the nozzle is reduced to such a degree that a single stage turbine, for example, is able to handle the entire expansion head at moderate stess levels. By way of contrast, comparable conventional impulse gas or vapor turbines require multiple stages. The turbine itself may consist of a liquid turbine that may be combined with a rotary separator in the manner to be described. Further, the reaction turbine is suited for operation with one component in two phases, such as water/water vapor (steam), ammonia/ammonia vapor, propylene/-propylene vapor. Other versions of the turbine operate with two components: a low vapor pressure fluid which remains liquid in the nozzle and turbine, and a high vapor pressure liquid which partially or totally vaporizes in the nozzle.

These and other objects and advantages of the invention, as well as the details of an illustrative embodiment, will be more fully understood from the following description and drawings, in which:

DRAWING DESCRIPTION

DETAILED DESCRIPTION

Figure 6:
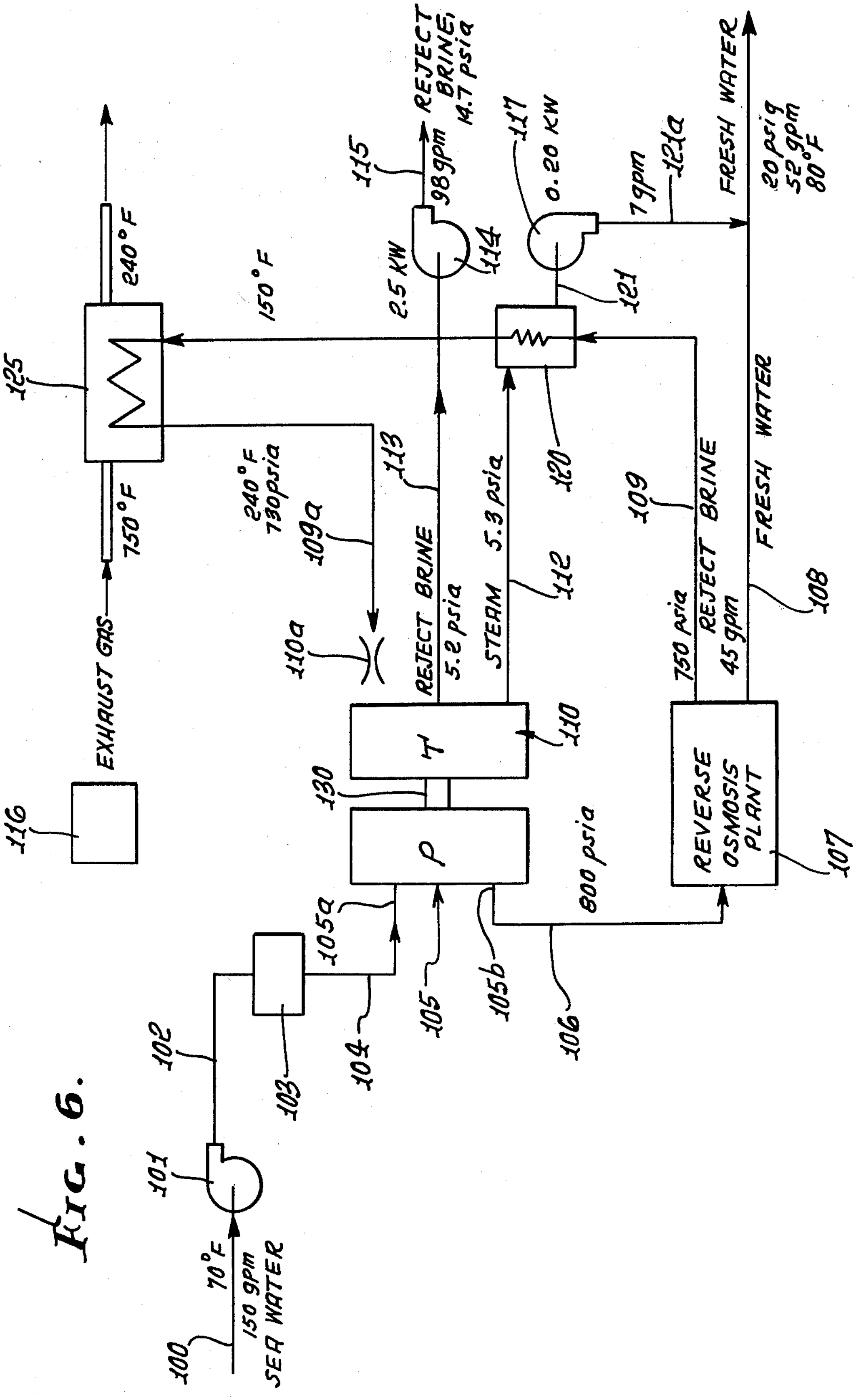
FIG. 6 is another diagram showing the modified desalination system of FIG. 5, with typical pressure and temperature conditions noted. It is seen that reject brine exiting the reverse osmosis plant at 750 psia (98 gpm) delivers its pressure energy to the two-phase turbine, and exits the turbine at 5.2 psia.

Referring first to FIG. 6, sea water at 0 psig 70° F. is fed at 100 to motor driven low pressure pump 101 and discharged at 102 at approximately 20 psig to a water pretreatment unit 103. The latter may incorporate a filter together with means to add small amounts of sulfuric acid to the flow to neutralize same. For example, about 10 gallons per day of acid may be added to sea water flowing at the rate of 150 gallons per minute.

The discharge at 104 is fed to inlet 105*a* of main pump 105 wherein the pressure of the flow is raised substantially (as for example to about 800 psig) for discharge via pump outlet 105*b* and supply at 106 to a reverse osmosis apparatus 107. The latter operates upon the feed to separate it into a low pressure fresh water stream, indicated at 108, and a high pressure reject brine stream 109. Reverse osmosis equipment exposes the feed to a selective membrane or membranes. Pure water flows through the membrane to the low pressure side, with salt and other impurities remaining behind the membrane. The natural tendency would be for the fresh water to flow from the side with higher fresh water concentration (and low salt concentration) to the side with lower fresh water concentration (high salt concentration). This tendency is referred to as to the osmotic pressure of the fresh water-salt water system. A high pressure difference across the membrane causes the fresh water to flow against such natural tendency, hence reverse osmosis. Makers of such equipment include Polymetrics, San Jose, California; Envirogenics Systems Co., El Monte, California; and Fluid Systems (Universal Oil Products), San Diego, California. The rejected brine stream may, for example, have a pressure of about 750 psig. The flow rate, pressure and temperature conditions shown in FIG. 6 are merely representative, but indicate that substantial fresh water flow is produced at 108; for example, about 30% of the seat water intake is converted to low pressure fresh water.

Pump 105 is driven by a turbine 110 of the type shown in FIGS. 1–3, and described below, in detail. That turbine receives liquid stream 109*a* (such as brine rejected by reverse osmosis unit 107) via a nozzle or nozzles 110*a* and discharged steam at 112 and brine at 113. The latter is fed via low pressure pump 114 to discharge 115. Brine stream 109 is preheated in condenser 120 and fed to a heat exchanger 125 (as for example a tubular exchanger) wherein it is heated, typically by the exhaust gas from a power plant 116 (as for example Diesel engine).

In the case of such Diesel engines, the gas temperatuare is typically high enough (about 750° F.) to provide energy required for the process. The pressure drop through the exhaust gas side of the exchanger is sufficiently low (as for example about 6 inches of water) so that back pressure imposed on the engine will not materially affect its operation.

Steam discharged from the turbine at 112 may be condensed as at 120 and fed at 121 to the fresh water input to a low pressure pump 117. The latter raises the pressure of feed 121 to the pressure of the fresh water output 108 of the reverse osmosis unit, to which pressurized output 121*a* is delivered.

Figure 1:
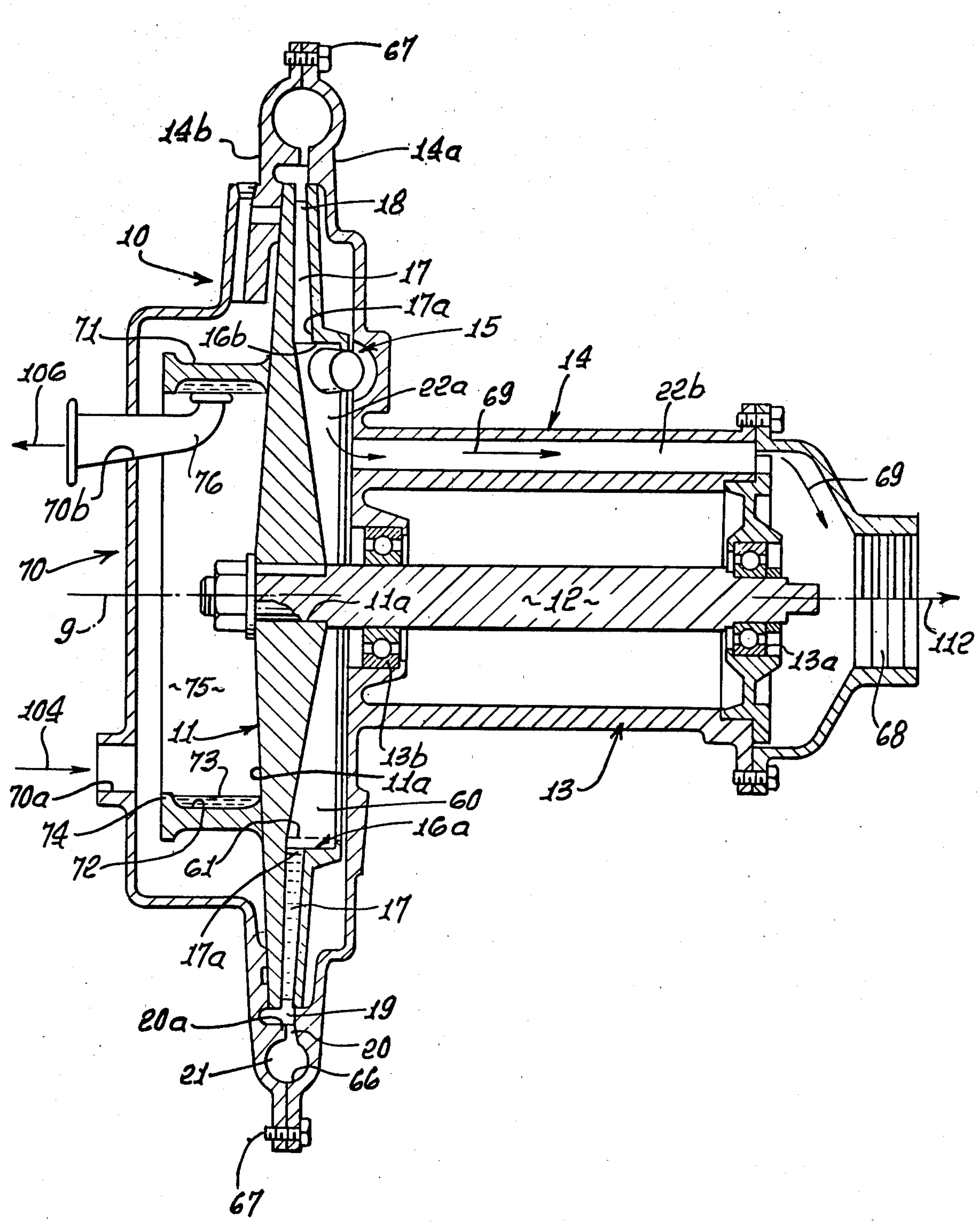
FIG. 1 is a vertical section through a two-phase reaction turbine and pump apparatus.
Figure 2:
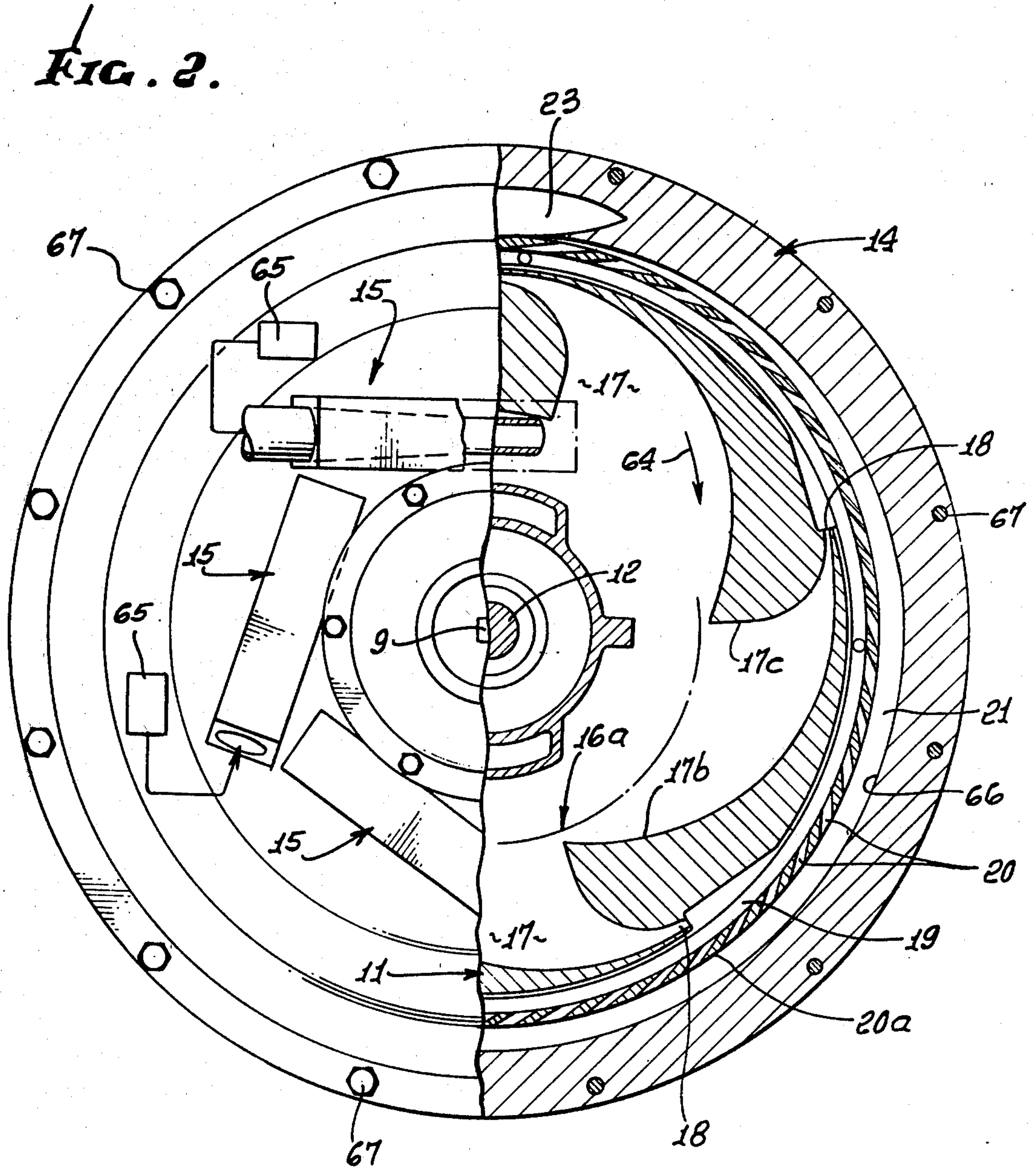
FIG. 2 is an axial view of the FIG. 1 apparatus.
Figure 3:
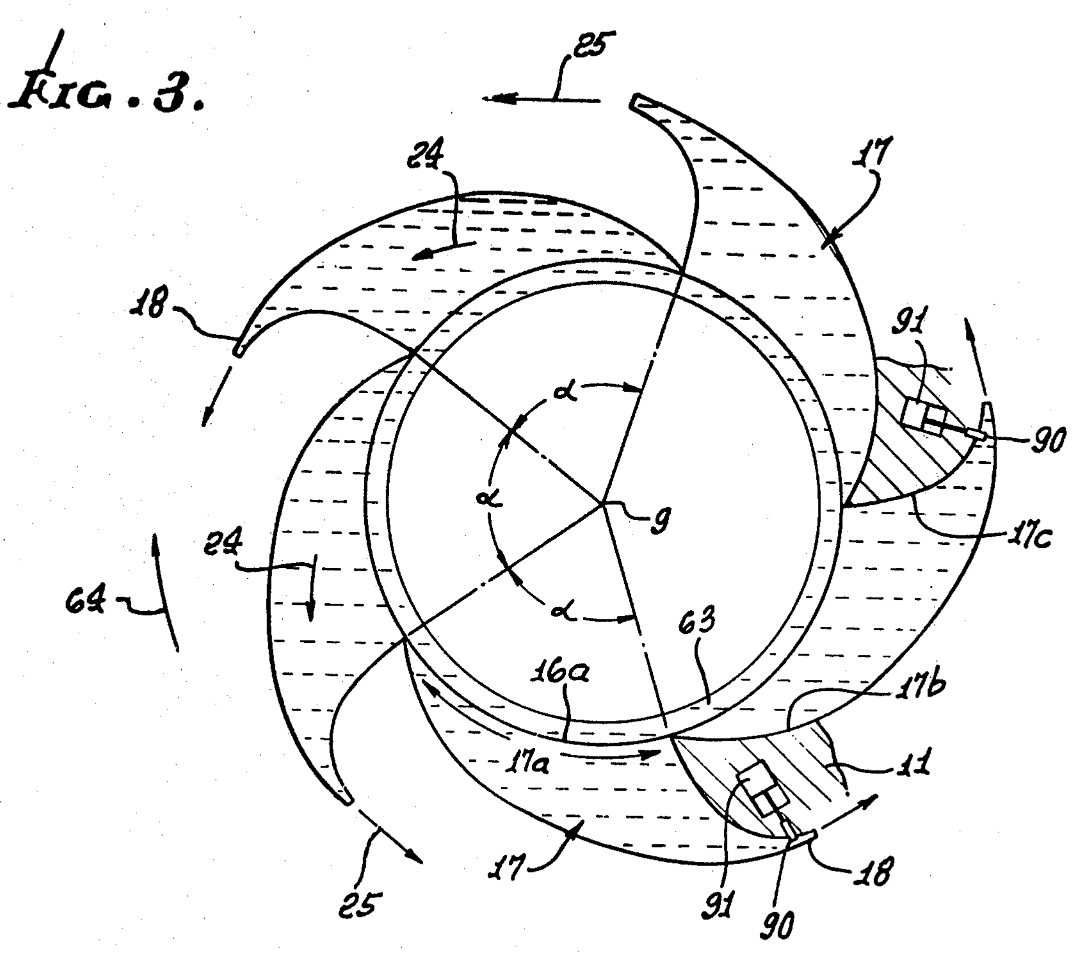
FIG. 3 is an axial schematic view of the rotor contour.

The high pressure pump 105 in FIG. 6 may be of ordinary type, and may be connected to the turbine via a shaft such as shaft 130; or, the pump may take the highly and unusually advantageous form shown in FIGS. 1–3, wherein the pump rotor is integral with the turbine rotor.

Referring now to FIG. 1, the single stage two-phase reaction turbine and pump combination 10 shown includes rotor 11 mounted at 11*a* on shaft 12 which may be suitably coupled to the pump as referred to above (or may be made integral with the pump rotor, as shown). The shaft 12 is supported by bearings 13*a* and 13*b*, which are in turn supported by housing 14. The two-phase nozzle 15, also carried by housing 14, is oriented to discharge the two-phase working fluid, such as brine stream 109*a* referred to above, at elevated pressure into the annular area 16*a* of rotary separator 11 wherein brine and steam are separated by virtue of the centrifugal force field of the rotating element 11. In this regard, the element 11 has an axis 9 and defines an annular, rotating rim or surface 16*b* located in the path of the nozzle discharge for supporting a layer of separated water on that surface. The separated steam collects in zone 60 spaced radially inwardly of inwardly facing shoulder or surface 16*b*. The nozzle itself may have a construction as described in U.S. Pat. Nos. 3,879,949 or 3,972,195. The surface of the layer of brine at zone 16*a* is indicated by broken line 61, in FIG. 1. The source of the brine fed to the nozzles is indicated at 65 in FIG. 2, and typically includes the exchanger 125 referred to.

The rotor 11 has reaction nozzle means located to communicate with the separated liquid i.e. water collecting in area 16*a* to receive such liquid for discharge in a direction or directions to develop torque acting to rotate the rotor. More specifically, the rotor 11 may contain multiple passages 17 spaced about axis 9 to define enlarged entrances 17*a* communicating with the surface or rim 16*b* and the liquid separating thereon in a layer to receive liquid from that layer. FIG. 3 schematically shows such entrances 17*a* adjacent annular liquid layer 63 built up on rim or surface 16*a*. The illustrated entrances subtend equal angles α about axis 9, and five such entrances are shown, although more or less than five entrances may be provided. Arrow 64 shows the direction of rotation of the rotor, with the reaction nozzles 18 (one associated with each passage) angularly offset in a trailing direction from its associated passage entrance 17*a*. Passages 17 taper from their entrances 17*a* toward the nozzles 18 which extend generally tangentially (i.e. normal to radii extending from axis 9 to the nozzles). Note tapered walls 17*b* and 17*c* in FIG. 3, such walls also being curved.

The nozzles 18 constitute the reaction stage of the turbine. The liquid discharged by the nozzles is collected in annular collection channel 19 located directly inwardly of diffuser ring 20*a* defining diffuser passages 20. The latter communicate between passage 19 and liquid volute 21 formed between ring 20*a* and housing wall 66. The housing may include two sections 14*a* and 14*b* that are bolted together at 67, to enclose the wheel or rotor 11, and also form the diffuser ring, as is clear from FIG. 1. FIG. 1 also shows passages 22*a* and 22*b* formed by the housing or auxiliary structure to conduct separated steam to discharge duct 68, as indicated by flow arrows 69.

The rotor passages 17 which provide pressure head to the reaction nozzles 18 are depicted in FIG. 2 as spaced about axis 9. Nozzles 15 are shown in relation to the rotary separator area 16*a*. It is clear that droplets of liquid issuing from the nozzles impinge on the rotary separator area 16*a*, where the droplets merge into the liquid surface and in so doing convert their kinetic energy to mechanical torque. One nozzle 15, or a multiplicity of nozzles, may be employed depending on desired capacity. The endwise shape or tapering of the liquid discharge volute 21 is easily seen in FIG. 2; liquid discharge takes place at the volute exit 23.

The flow path for the liquid i.e. water or brine in the rotor of the turbine is shown in FIG. 3 to further clarify the reaction principle. Liquid droplets from the nozzle impinge on the liquid surface 16*a*, and the liquid flows radially outward in the converging passages 17 to the liquid reaction nozzles 18. The reaction nozzles 18 are oriented in tangential directions adding torque to the rotating element. Liquid flow within each passage 17 is in the direction of the arrow 24. Jets of liquid issuing from the reaction nozzles 18 are in the tangential directions shown by the arrows 25.

FIG. 3 also shows the provision of one form of means for selectively closing off liquid flow from the nozzles to vary the power output from the rotor. As schematically shown, such means includes gates or plugs 90 movable by drivers 91 into different positions in the passages 17 to variably restrict flow therein.

The flow rate, pressure and temperature values used in FIG. 6 are typical of a highly efficient system; however they can be varied in other systems.

Referring again to FIG. 1, a pump is made integral with the rotor and is generally indicated at 70 (corresponding to pump 105 in FIG. 6). It includes an annular flange or rim 71 extending about axis 9, and having an inward facing annular surface 72 that rotates with rotor 11. Brine such as sea water is supplied via line 104 to the pump inlet 70*a* (corresponding to inlet 105*a* in FIG. 6), the brine then collecting in an annular ring 73 on surface 72 between rotor wall 11*a* and ledge 74. The entering water is typically at low pressure, as for example to about 20 psig, and accelerates as its pressure drops to the lower pressure in zone 75. A diffuser channel or scoop (pitot) 76 penetrates the high velocity ring of water and collects the water, converting its kinetic energy into a pressure increase, as for example for about 800 psig. The high pressure water then flows via the diffuser 76 and line 106 to the reverse osmosis equipment. The pump outlet appears at 70*b* (corresponding to outlet 105*b* in FIG. 6).

Figure 5:
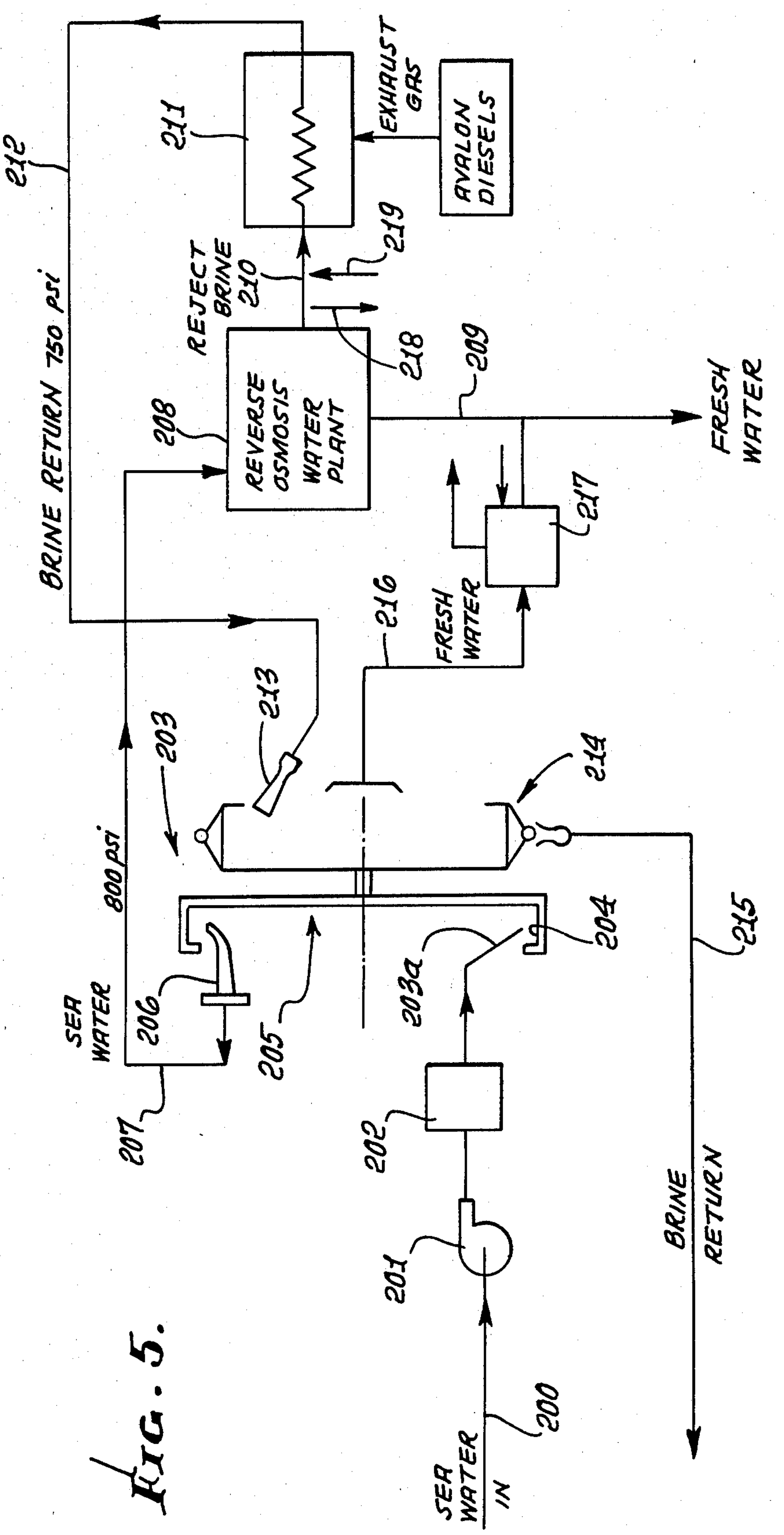
FIG. 5 is a diagram showing a desalination system incorporating rotary apparatus as shown in FIG. 1, and in which the pressure energy in the "brine return"('-'reject brine") is recovered by using the reject brine as the two-phase turbine working fluid.

Referring now to FIG. 5, it shows a system for producing fresh water and using waste heat and reverse osmosis equipment, somewhat like FIG. 6. Entering sea water at 200 is pumped at 201 to a relatively low pressure to flow through filters 202 and enter at 203*a* the pump side of the apparatus 203. The latter typically corresponds to the equipment shown in FIG. 1, and described above. Brine flows onto rim 204 of pump 205, the resulting high velocity ring of brine being collected by Pitot scoop 206 at high pressure, to flow at 207 to the reverse osmosis equipment 208. Fresh water emerges from the latter at 209, and constitutes about 30% of the supply. Rejected brine flows at 210 to the waste heat exchanger 211, picking up heat and flowing at 212 back to apparatus 203. The heated brine flows via nozzles 213 into the turbine 214 (which drives the pump) integral with the pump rotor, and corresponding to turbine 10 in FIG. 1. Separated brine emerges from the turbine and flows at 215 to discharge. Steam emerges from the turbine at 216 and flows as fresh water to add to the fresh water stream 209. A condenser 217 may be employed to condense the steam, and pre-heat the brine stream 210, lines 218 and 219 indicating brine flow to and from the condenser.

Figure 4:
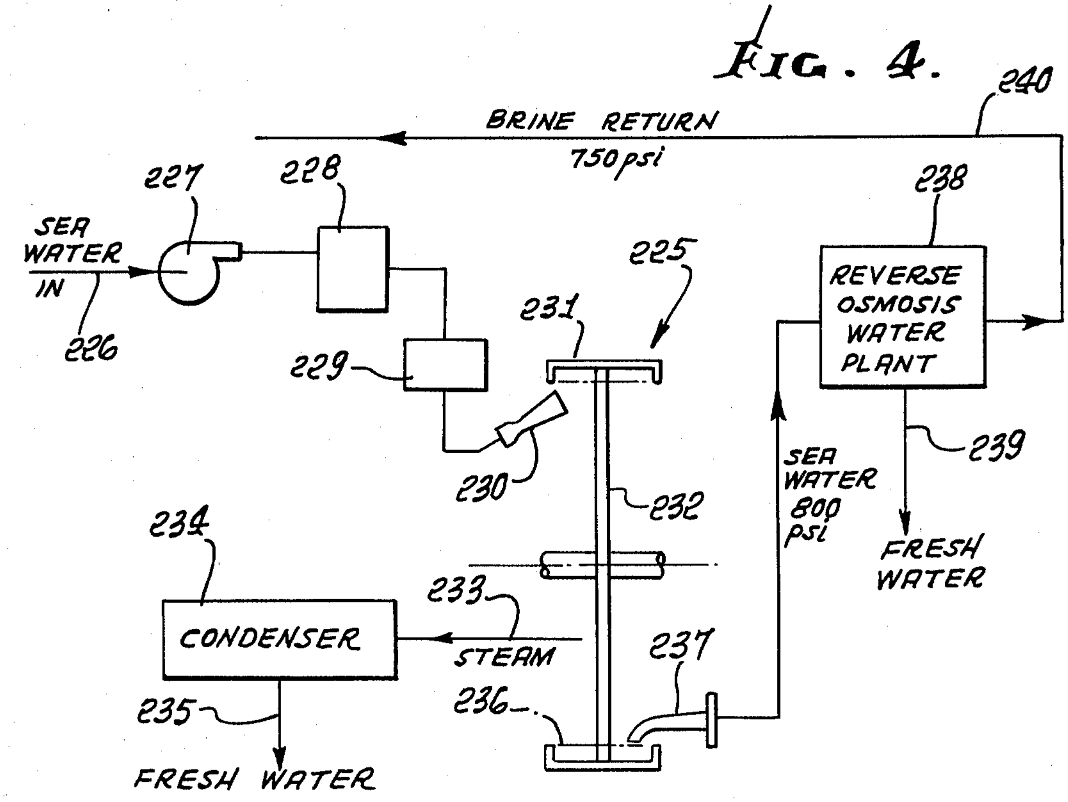
FIG. 4 is a diagram showing use of a specialized pump in a desalinization system, in which the pressure energy in the "brine return" is not recovered.

Referring to FIG. 4, it shows a system for fresh water production, and employing a pump 225 similar to pump 205. Brine at 226 is pumped at 227 to a low pressure sufficient to pass the flow through to filter 228 and heater 229, for supply to a nozzle 230 (converging-diverging). From the latter, the brine emerges as liquid and vapor, the liquid impinging on the separator rotor or rim 231 and rotating the rotor wheel 232. Separated vapor collects as steam and flows at 233 to a condenser 234 from which water condensate emerges at 235.

Figure 7:
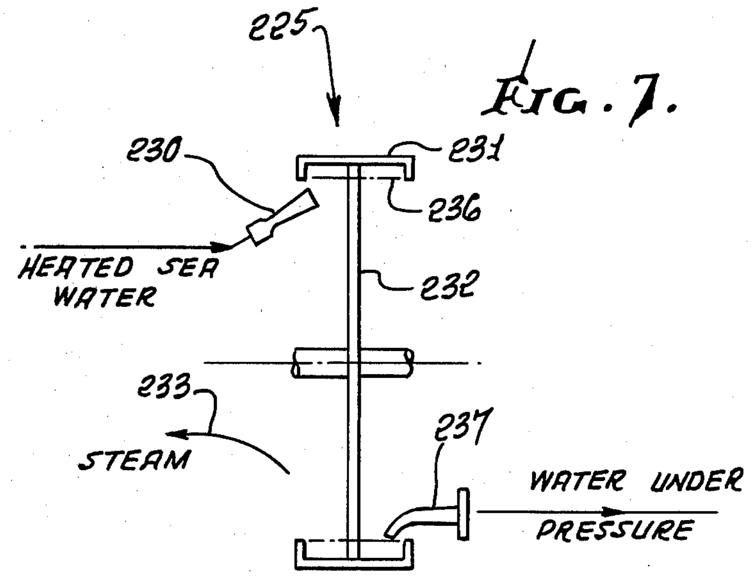
FIG. 7 shows the basic two-phase nozzle and separator used to pump sea water (for example) to high pressure for delivery to a reverse osmosis system, the energy required being applied to heat the incoming sea water.

Brine collecting as a high velocity ring of liquid 236 on the rim 231 is removed by scoop 237 at the opposite side of the wheel body 232, for supply as high pressure brine to the reverse osmosis equipment 238. Fresh water emerges from the latter at 239, and brine at 240, for return to source. The separator apparatus 225 is of the type described in U.S. Pat. No. 3,879,949. It is also shown by itself in FIG. 7.

Figure 8:
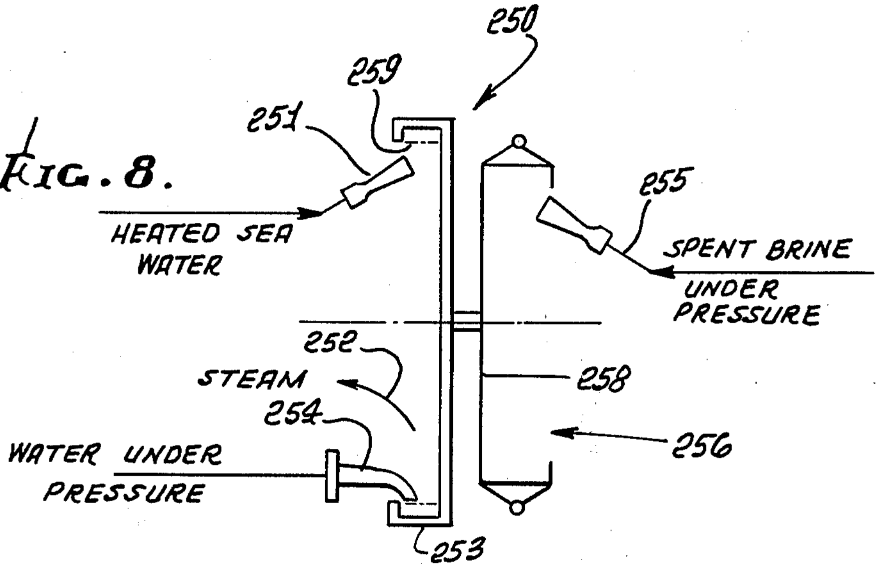
FIG. 8 shows the addition of a pressure recovery reaction turbine directly to the back side of the two-phase turbine of FIG. 7, the additional energy developed by the liquid reaction turbine being used to increase the power and capacity of the integrated machine.

FIG. 8 shows apparatus 250 by itself, and which is similar to the described above in FIG. 5. In this case, however, the entering brine is pre-heated as in FIGS. 4 and 7, and flows via a nozzle 251 to emerge as liquid and vapor. The vapor is separated from the liquid and emerges as steam at 252, which may be condensed as fresh water. The liquid impinges on the rim 253, collects as a high velocity ring 259 and is removed by scoop 254. Spent brine under pressure flows at 255 to the turbine 256 side of the apparatus, the turbine being the same as in FIG. 1. The common rotor for the turbine and pump (separator) is shown at 258.

Figure 9:
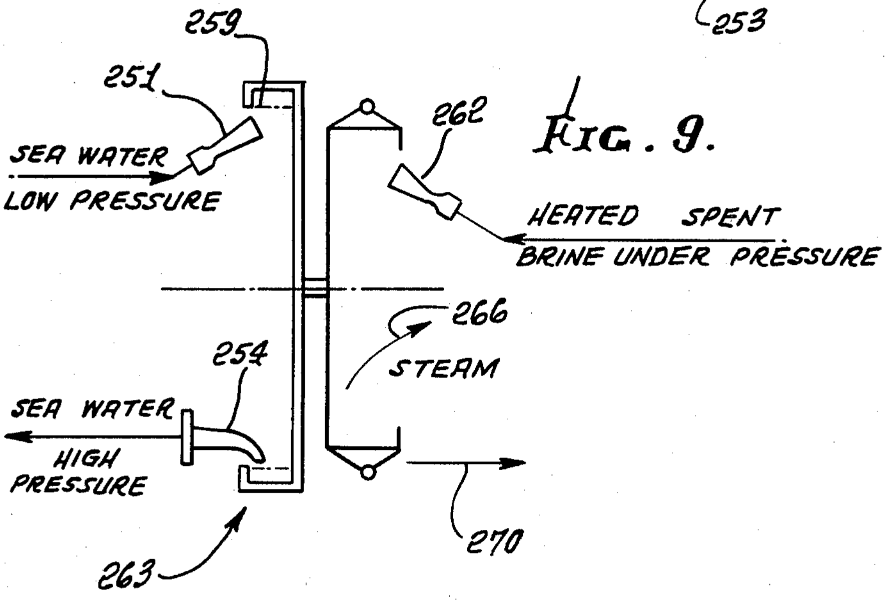
FIG. 9 shows a further aspect of machine integration, in which the two-phase turbine and the reaction turbine are combined into a single element shown on the right side, with the heat energy being added to the reject brine, and with the left side becoming a seat water pump only.

A still further aspect shown in FIG. 9 concerns adding the heat energy to the spent brine which is under pressure, and expanding this spent brine in a two-phase nozzle 262 to produce power for pump 263, as in FIG. 8, and also in FIG. 1. Sea water under low pressure is injected by a liquid nozzle 251 to the left side of the wheel and pumped to 800 psig by the stationary pick-up/diffuser 254. The FIG. 9 aspect has the advantage that steam is produced at 266 from the spent brine, and the pressure energy of the spent brine is efficiently recovered without requiring additional mechanical elements.

In all of the above, "sea water" may be replaced by "brackish water" or by any water requiring purification. Non-aqueous streams subject to reverse osmosis may be substituted for "sea water" or "brine". "Reverse osmosis" may be replaced by any membrane purification process. Efficiency calculation of the process of pumping and energy recovery shown in FIG. 9 gives 70 to 75 percent efficiency; whereas other conventional energy recovery/pumping processes operate at efficiencies below 40%.

I claim:

1. In reaction turbine and pump apparatus, the combination comprising (a) first nozzle means to receive heated fluid for expansion therein to form a two-phase discharge of gas and liquid, (b) a separator rotor having an axis and a rotating surface located in the path of said discharge for supporting a layer of separated liquid on said surface, (c) the rotor having reaction nozzle means to communicate with said layer to receive liquid therefrom for discharge in a direction or directions developing torque acting to rotate the rotor, (d) and a pump associated with and driven by said rotor, the pump including an annular rim surface to receive impingement of liquid to be pumped, the liquid collecting as a rotating ring on said rim surface.

2. The combination of claim 1 wherein the pump includes scoop means to remove said collected liquid as a pressurized stream.

3. The combination of claim 1 wherein said pump includes a nozzle through which fluid passes as a jet directed toward said rim surface.

4. The combination of claim 1 wherein said rim surface is integral with said separator rotor.

5. The combination of claim 3 wherein the rotor defines passage means communicating with said surface to receive liquid flowing from said layer, the passage means extending generally radially outwardly relative to said axis so that liquid in said passage means is pressurized by centrifugal force.

6. The combination of claim 4 wherein said reaction nozzle means includes multiple reaction nozzles directed generally tangentially relative to the paths of nozzle rotation.

7. The combination of claim 4 wherein said passage means includes multiple passages each terminating at one of said reaction nozzles, the passages tapering toward the nozzles.

8. The combination of claim 6 including means for selectively closing off liquid flow from the nozzles to vary the power output from the rotor.

9. The combination of claim 3 wherein said heated fluid consists of a low vapor pressure fluid component which remains liquid, and ahigh vapor pressure fluid which at least partially vaporizes in said first nozzle means, there being a source for said heated fluid, and there also being a source for said liquid received by the pump.

10. The apparatus of claim 1 wherein the pump has an inlet connected to a brine source and the pump has an outlet, and reverse osmosis apparatus connected to the pump outlet to receive pressurized brine therefrom, and to deliver fresh water extracted from the brine.

11. The apparatus of claim 1 incuding means to transfer waste heat to said fluid which constitutes working fluid.

12. The system of claim 11 wherein said two-phase working fluid produces steam when jetted through said nozzle means, and including a condenser connected to receive said steam for condensing same to supply as fresh water.

13. The system of claim 11 wherein said working fluid comprises water.

14. The system of claim 12 wherein said condenser is connected with said reverse osmosis apparatus to receive pressurized brine therefrom for receiving heat from said condensing steam.

15. The system of claim 14 including means connected to receive the brine from said condenser for transfer of waste heat thereto.

16. The system of claim 14 wherein reject brine from the reverse osmosis apparatus, which is under pressure, is directed via ducting toward the nozzle means to be used as the turbine working fluid, thereby conserving the energy in the pressurized fluid.

17. The combination of claim 10 wherein waste heat is supplied by means other than a power plant, as for example engines operating pumps or compressors, or by the exhaust heat from furnaces or kilns.

18. The combination of claim 10 wherein the heat supplied to the working fluid is supplied by suitable means such as solar energy collector, geothermal source, combination of waste fuel, or combustion of refuse.

* * * * *